Feb. 8, 1966  R. W. SCHOOLEY, JR  3,234,360
STRIPE COUNTER
Filed July 11, 1962
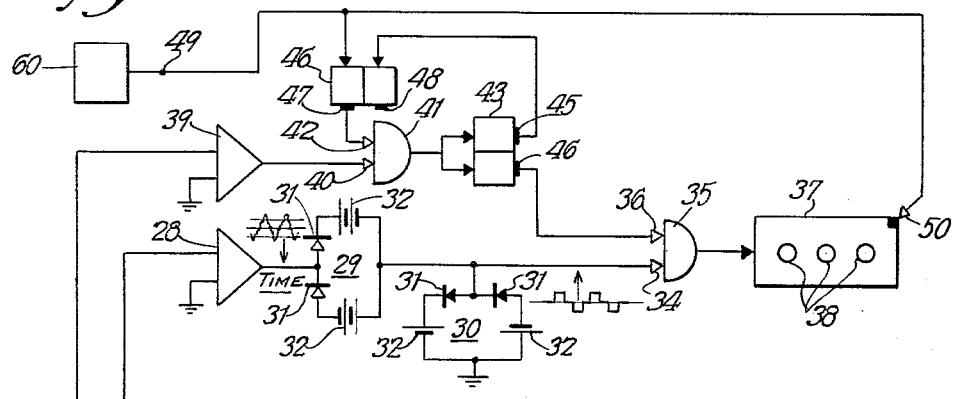
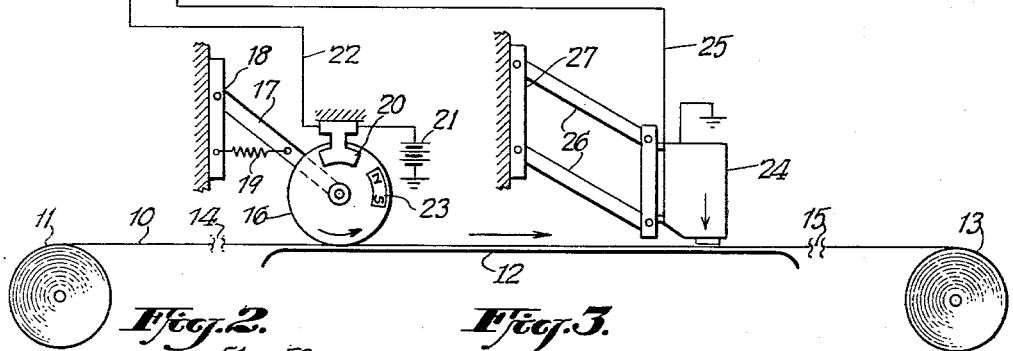
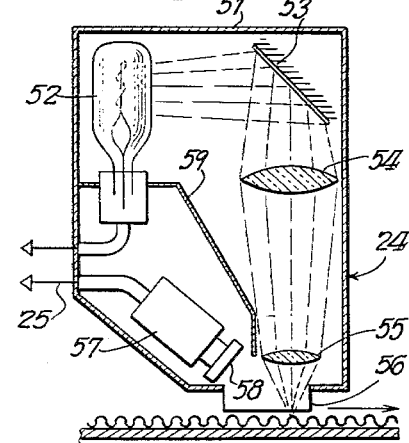
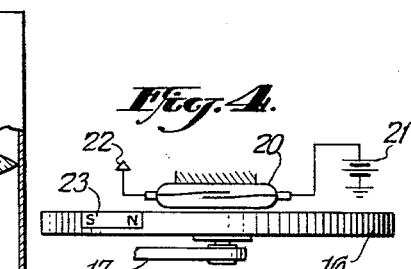
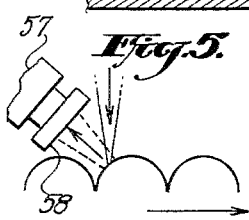
INVENTOR.
ROBERT W. SCHOOLEY JR.
BY
Ward, Neal, Haselton, Orme & McElhannon
ATTORNEYS.

United States Patent Office 3,234,360
Patented Feb. 8, 1966

3,234,360
STRIPE COUNTER
Robert W. Schooley, Jr., R.D. 2, Lebanon, N.J.
Filed July 11, 1962, Ser. No. 209,026
4 Claims. (Cl. 235—92)

This invention relates to the high speed counting of minute objects and more particularly it concerns a method and apparatus for providing an indication of the concentration of threads or systematic agglomerations thereof which form patterns of strips along certain surfaces, such as textiles.

The term "stripe" is used herein to denote one of several elongated divisions of a surface. More particularly, in the case of textile and other fabrics, the term "stripe count" is intended to refer generically to the number of alternate ridges and furroughs or crests and depressions in the fabric surface which result from the threads or the successive systematic aggregations thereof which make up the fabric.

In the manufacture of textiles, it is important to provide some indication of the stripe count per lineal inch of fabric being produced. In the case of woven goods, this stripe count is referred to as the thread count and generally represents the number of weft or pick threads going into the material; while in the case of knitted goods, it is referred to as the course count and usually represents the number of rows of stitches being made per lineal inch of knitted fabric. In either case such a count provides the manufacturer with a knowledge of the weight or "yield" of the resulting material. This in turn permits a proper adjustment to be made so that production of a constant grade of material is assured. It can be seen that from the standpoint of both quality and efficiency of manufacture such information is of great value.

Prior methods for obtaining stripe count have amounted to visually counting the number of stripes in a given length of the material. This, however, is tedious and time consuming and generally requires that processing machinery be stopped so that the observer can make an accurate count.

Various techniques have been tried in an effort to automate the counting process but have been only partially successful. One such technique involves the use of a light source on one side of the fabric and a photocell disposed on the other side directly opposite the light source.

The threads and the spaces between them operate in the capacity of shutters which alternately transmit and interrupt light to the photocell as the fabric moves transversely between it and the light source. Whenever light from the source passes between threads, it energizes the photocell and a voltage signal is produced. Then when a thread interrupts the passage of light to the photocell, it becomes de-energized and its output voltage signal is cut off. The number of output voltage signal changes thus produced represents the stripe count for the fabric.

A major disadvantage of this technique lies in the fact that the threads in a great many fabrics are so closely concentrated that no spaces exist between them. Furthermore, even in cases where such spaces do occur, small variations in the construction of the fabric such as, for example, changes in pattern or inadvertent local thread shifting may cause closing of the spaces and thus render the sensing process inoperable.

According to one feature of the present invention, rapid and automatic counting of highly concentrated threads and agglomerations thereof is made possible by generating signals according to the variations which the individual stripes produce in the overall surface contour of the fabric. Since textile threads are generally round in cross-sectional configuration, the fabricated surface they form must of necessity be characterized by minute crests and depressions or hills and valleys equal in number, along a given line, to the number of threads crossing that line. Furthermore, these hills and valleys are present no matter how highly concentrated the threads making up the fabric happen to be. Thus it is not necessary that each thread by physically separated from all the others in order to be counted. By counting and registering the signals generated over a given distance of fabric, an indication of the stripe count may be obtained. This indication may be presented for visual observation as described herein or if desired, it may be used for automatic regulation of the processing operations according to any of several well-known control techniques.

In a preferred embodiment of the invention, means are provided to sense only those signal variations which have amplitudes corresponding to the surface contour effects produced by the individual threads. These signal variations are accumulated in a manner such that their total number may be ascertained. Means may further be provided to control the counting so that signals are counted and registered only within a known interval along the surface. This count is then preserved until a new indication is desired whereupon a starting signal is applied to the system. The starting signal resets the counting means and permits the system to begin a new count.

According to a further feature of the invention, the hills and valleys in a fabricated surface are counted by utilizing the variational reflection characteristics which are peculiar to such a surface. Although the radiant reflectivity of the various threads may be identical, the rounded surface of each of them causes the reflection angle for a highly concentrated beam to vary as they move transversely with respect to the beam. Thus, by concentrating a beam of radiant energy, such as light, on the fabricated surface and by noting the resultant variations in reflected light intensity from the moving surface along a line at a fixed angle to the beam, the hills and valleys, or the number of stripes may be ascertained. The highly concentrated beam may be achieved with conventional focusing techniques while the variations in reflected light intensity may be detected by means of a photocell or other photosensitive element.

It is an object of the present invention to expedite the counting of minute elements along a given surface.

It is another object to provide a clear, accurate and rapid indication of stripe concentration in a fabric material.

A further object of the present invention is to provide such a stripe count with a minimum of equipment and with a minimum effect upon the actual elements being counted.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized in a variety of ways for carrying out the several purposes of the invention. It is important, therefore, that the claims be regarded as including such equivalent ways as do not depart from the spirit and scope of the invention.

A specific application of the invention is shown in the accompanying drawings and is described in the following portions of the specification.

In the drawings:

FIG. 1 is a schematic, illustrating apparatus for obtaining an indication of thread or course count per lineal inch of fabric according to the principles of the present invention;

FIG. 2 is a side view showing the internal construction of the sensing element shown in FIG. 1;

FIG. 3 is an end view of the sensing element of FIG. 2;

FIG. 4 is a top view showing in greater detail the base line indicating element of FIG. 1;

FIGS. 5 and 6 are diagrammatical representations useful in visualizing the operation of the sensing element of FIGS. 2 and 3; and FIG. 7 is a magnified surface view of a typical piece of fabric whose construction may be analyzed according to the present invention.

In the arrangement shown in FIG. 1, a web 10, of fabric material moves from a supply roll 11 and onto a take-up roll 13. In some environments, a guide plate 12 is provided under the web to aid in guiding its movement. The web 10 is shown broken at points 14 and 15, to indicate the omission in the present illustration of the many additional processing steps which occur in an actual system but which form no part of the present invention.

A base line indicating means is provided to produce signals in accordance with the linear movement of the web piece 10. The base line indicating means includes a wheel 16, mounted to rotate at one end of a support rod 17. The other end of the support rod 17 is adapted to pivot about a point 18 which is fixed with respect to the supply and take-up rolls 11 and 13. A tension spring 19 is connected between another fixed point 18' and a point along the support rod 17. The tension spring acts to control pressure of the wheel 16 against the fabric or web 10 so that just enough frictional force is developed between the web and wheel to cause the wheel to rotate without slippage in the direction indicated by the arrow thereon.

A switching means 20 is provided in close proximity to the wheel 16 and operates to connect a voltage source or battery 21 to a base line lead 22 for a short time after each complete revolution of the wheel. The switching means 20 may be of conventional construction, such as for example, a mechanically actuated microswitch. It is important, however, in the measurement of fabrics that frictional resistance in the measuring system be reduced to the greatest extent possible so that distortion of the fabric and consequent erroneous indications will not occur. For this reason, a substantially friction-free apparatus such as the magnetically actuated switch arrangement shown in FIG. 4, is utilized in the preferred embodiment. As shown in FIG. 4, the switching means 20 takes the form of a magnetically actuated reed switch located next to one side of the wheel 16 near its periphery. A small bar magnet 23 is located on the side of the wheel 16 facing the switch 20, and is positioned such that as the wheel 16 rotates, the bar magnet 23 moves longitudinally past the switch 20. When the magnetic field surrounding the bar magnet 23 envelops the contacts of the switching means 20, it causes them to close with a minimum of reaction force being produced on the wheel 16. In this manner an accurately timed voltage pulse is produced on the output lead 22 each time the wheel 16 completes a revolution.

A surface contour sensing unit 24 is provided to sense the surface variations caused by the individual threads or courses making up the web material 10. Voltages representative of these surface variations are produced on a contour signal lead 25 by the sensing unit 24. The sensing unit is supported by means of a parallel linkage 26 connected to a fixed plate 27. The parallel linkage arrangement insures that the sensing unit 24 is properly directed at a point on the surface of the web 10 so that an accurate representation of its surface characteristics may be obtained. The pivot points of the parallel linkage may be locked or free depending upon the manner in which the sensing unit operates. Springs and counter-balances may also be provided in well-known manner to insure that the sensing unit rests on or above the fabric material in close proximity thereto.

The voltages appearing on the contour signal lead 25 are amplified in a sensing unit amplifier 28. A typical wave form of such voltages is shown at the output of the amplifier 28. It will be noted that these wave forms have a jagged appearance which may represent various microscopic irregularities in the surfaces of the individual threads or courses as well as certain aberrations and distortions within the sensing system itself. It will be noted however that the general trend of the wave form signifies the occurrence of individual threads or courses under the sensing unit.

A threshold circuit 29 and a limiting circuit 30 are provided to modify the wave form so that its general peaks, which represent those aspects of the voltage wave form which are attributable only to the threads or courses themselves, are converted to voltage pulses. The threshold and limiting circuits 29 and 30 are of identical construction, each comprising a pair of directly connected diodes 31 and a pair of directly connected voltage sources 32, arranged in closed loops. The voltage sources in each loop are arranged in the same direction and the diodes in each loop are arranged in opposition to the voltage sources. It has been found that for many applications the "energy gap" inherent in conventional diodes may be utilized in place of the voltage sources as a means of establishing a threshold or breakdown level. It will also be apparent to those skilled in the art that a Zener diode arrangement can be utilized for the same purpose. The output of the sensing unit amplifier 28 is connected between the diodes of the threshold circuit 29. The output of the threshold circuit is taken from between its voltage sources 32. This output is shunted to ground by means of the limiting circuit 30; which in turn is arranged so that the output of the threshold circuit 29 is connected between the diodes 31 of the limiting circuit 30, while a ground terminal 33 is connected between its voltage sources 32. The wave form resulting from the operation of these circuits is shown in FIG. 1, near the output of the limiting circuit 30. This output wave form will be seen to comprise discrete voltage pulses which occur as each stripe in the web 10 passes under the contour sensing unit 24.

These voltage pulses are applied to a first input terminal 34 of a signal coincidence or counter AND circuit 35. The counter AND circuit 35 produces output pulses whenever finite voltages appear simultaneously at both the first input terminal 34 and at a second input terminal 36. AND circuits are well-known devices employed in the digital computer and related arts. Examples of such circuits suitable for use in conjunction with the present system are shown on pages 397–400 of the text entitled, Pulse and Digital Circuits, by Jacob Millman and Herbert Taub, McGraw-Hill Book Co., New York, 1956. Output pulses from the counter AND circuit 35 are applied to a counter-register 37. The counter-register may be of any conventional construction which is capable of producing signals representative of the number of input pulses which have occurred over a given period. In the present situation, it has been found advantageous to display this information in decimal form on lighted numeral indicators 38. These numeral indicators may be, for example, Nixie lights which are produced by the Burroughs Corporation.

The voltage pulses appearing on the base line output lead 22 are amplified in a base line amplifier 39 and then applied to a first input terminal 40 of a base line signal coincidence or AND circuit 41. This AND circuit is similar to the counter AND circuit 35 and like that circuit it produces an output signal whenever finite voltages appear at the same time at both its first input terminal 40 and at a second input terminal 42. The output signals from the base line AND circuit 41 are applied simultaneously to both input terminals of a first bistable switching device 43. The bistable switching device has a pair of output terminals 44 and 45, one or the other of which remains at a finite voltage level depending upon the state of the device. The bistable switching device may be of mechanical or electrical operation although in the present application it is shown as an electronic bistable multi-vibrator. The first output terminal 44 of the bistable switching means 43 is connected to the second input terminal 36 of the counter AND circuit 35. Its second output terminal 45 is connected to one input terminal of a second bistable switching device 46 which also may take the form of a bistable multi-vibrator. This second switching device likewise has a pair of output terminals 47 and 48 upon which finite voltages appear depending upon its state. The first output terminal 47 of this second switching device is connected to the second input terminal 42 of the base line AND circuit 41.

A start terminal 49 is connected both to the second input terminal of the second bistable switching device 46 and to a reset terminal 50 in the counter-register 37. Finite voltage pulses are supplied to the start terminal 49 whenever a new indication of stripe count is desired. In many situations it is desirable to have a new indication at periodic intervals of say every 30 seconds or every few minutes. To this end, a time base generator 60 is provided. The time base generator operates to produce a start voltage at the terminal 49 at the desired intervals. Such device may take the form of a relaxation type oscillator or a free running multi-vibrator, for example.

The system operates in the following manner. As the supply and take-up rolls 11 and 13 rotate, the web 10 of fabric material is moved toward the take-up roll 13 and passes under the contour sensing unit 24. As this occurs, the wheel 16 revolves and generates finite voltage pulses on its base line output lead 22 each time the web 10 has moved a certain distance, equal to the circumference of the wheel. Meanwhile, voltage wave forms are produced in the contour sensing unit 24 and are amplified in the sensing unit amplifier 28 to produce a wave form similar to that shown in FIG. 1. The threshold and limiting circuits 29 and 30 convert this wave form to pulses representative of the threads or courses passing under the sensing unit 24.

Initially the terminal 42 on the base line AND circuit 41 is at zero voltage as is the second input terminal 36 of the counter AND circuit 35. Consequently, none of the signals from either the base line indicating means or from the contour sensing unit have any effect upon the counter-register 37.

When a new indication of stripe count is desired, a finite voltage is applied at the start terminal 49. This voltage is applied to the reset terminal 50 and immediately resets the counter-register 37 to zero count. At the same time, the start terminal voltage is applied to change the state of the second bistable switching means 46. This in turn causes a finite voltage to appear at its first output terminal 47; which voltage also appears at the second input terminal 42 of the base line AND circuit 41. When the base line wheel 16 next rotates sufficiently to close the contacts of the reed switch 20, the voltage thus generated on the base line output lead 22 passes through the base line AND circuit 41 to change the state of the first bistable switching means 43. This removes the finite voltage from the second output terminal 45 of the first bistable switching means 43 and produces a finite voltage on its first output terminal 44. This finite voltage also appears at the second input terminal 36 of the counter AND circuit 35, enabling it to pass the voltage pulses appearing at its first input terminal 34. These pulses represent the individual stripes passing under the contour sensing unit 24. As the voltage pulses continue to accumulate in the counter-register 37, their sum appears in decimal form at the lighted numeral indicators 38. When the wheel 16 completes another revolution, a subsequent pulse appears at the first input terminal 40 of the base line AND circuit 41 and passes through to the first bistable switching means 43 causing it to change state. This simultaneously removes the finite voltage from the second input terminal of the counter AND circuit 35, causing it to prevent further signals from the contour sensing unit 24, and also applies a finite voltage to change the state of the second bistable multi-vibrator 46 which removes the finite voltage from its first output terminal 47. This renders the contour sensing unit ineffective to supply signals to the counter-register 37. It also renders the base line indicating means ineffective to initiate further count until a subsequent signal appears at the start terminal 49. The number appearing at the indicator lights of the counter-register 37 thus represents the number of threads or courses contained in the web 10 over a distance equal to the circumference of the wheel 16. For purposes of simplification, it has been found convenient to make the circumference of the wheel 16 equal to ten inches. Thus, by placing a decimal point one digit in from the extreme right hand indicator light 38, the counter-register 37 is made to indicate automatically the number of threads per inch of web material, to a resolution of one-tenth thread per inch.

A preferred form of the contour sensing unit 24 is shown in FIGS. 2 and 3. This arrangement makes use of the fact that the hills and valleys formed on the surface of the fabric material by the individual threads or courses cause a variation in reflection angle along the surface of the material. Thus, for a line at a fixed angle with respect to a beam directed at the surface of the material, reflected energy along that line would vary in intensity in a periodic manner and thus provide an indication of each stripe as it passes by.

Referring now to FIG. 2, the preferred form of the contour sensing unit 24 may be seen to include an outer casing 51 containing a light source 52 in conjunction with a lens and mirror arrangement. The light source is constructed to radiate in a generally horizontal direction toward an inclined mirrored surface 53. Rays reflected from the mirrored surface pass downwardly through a condensing lens 54 and a focusing lens 55 toward a spacer head 56. The condensing lens 54 operates to appropriate a large quantity of light energy from the source 52 and to direct this energy toward the focusing lens 55. The focusing lens then concentrates this light energy into a predefined area at a distance from the lens equal to that of the lower surface of the spacer head 56. The focusing lens 55 is preferably adjusted so that the dimension of the beam incident upon the fabric in the direction of fabric movement is less than one-half of the diameter of the individual threads or courses to be counted.

A photosensitive element 57 is also located within the outer casing 51. The photosensitive element may be a photocell or other such device capable of producing output voltages representative of the intensity of radiant energy impinging upon a light sensitive surface 58. The light sensitive surface is preferably arranged at an angle of approximately 30° with respect to the center line of the beam. The photocell is thus made to respond to light energy from the beam which is reflected back to it from the fabric surface. A light shield 59 is provided within the outer casing 51 between the lens and mirror system and the photosensitive element 57. This protects the photosensitive element from any stray light rays which may occur within the sensing unit. This serves to ensure high overall sensitivity and accuracy for the system. The voltage variations produced within the photosensitive element 57 by the action of the fabric reflected light energy are supplied by the element to the contour signal lead 25.

The manner in which the preferred form of the contour sensing unit 24 operates will now be described. In FIGS. 5 and 6 are shown periodic contour variations which represent stripes making up the surface of a fabric material. These stripes may be, for example, the weft, pick or warp threads in the case of a woven fabric, or they may be the courses or wales in the case of a knitted fabric. In either case, they are characterized by crests and depressions often commonly referred to as hills and valleys. As shown in both FIGS. 5 and 6, the concentrated rays of the light beam generated within the sensing unit 24 impinge upon the fabric from a direction substantially perpendicular to its surface. It will be noted that the cross-section dimension of the beam in the direction of movement of the fabric is substantially less than the corresponding width or diameter of the various stripes. It has been found that optimum results are attained when this beam dimension is maintained at less than one-half of the average stripe width. The light sensitive surface 58 of the photosensitive element 57 is shown in FIGS. 5 and 6 in a fixed relation to the center line of the beam.

As the fabric moves with respect to the light beam in the direction of the arrow, it can be seen that the slope of the individual thread or course surface struck by the beam is constantly changing. This in turn causes the light reflected from the fabric to be directed at various angles with respect to the incident beam. In FIG. 5, the slope of the surface being struck is such that the light reflected therefrom becomes directed toward the light sensitive surface 58 of the photosensitive element. However, when the fabric has moved slightly, as in FIG. 6, the light beam will be seen to strike the surface of a thread or course at a point such that the reflected energy becomes directed away from the light sensitive surface 58. Continuous movement of the fabric under the light beam thus causes the reflected light energy to swing alternately into and out of the field of vision of the photosensitive element. The resulting voltages produced by the element will be understood to represent, to a certain degree, the actual physical contour of the surface of the fabric.

It should be noted that because of the convex shape of the threads or courses and because of various irregularities on their surface, the reflected light energy is somewhat dispersed. However, by utilizing a highly concentrated incident light beam and by maintaining the surface of the photosensitive element at an angle of approximately 30° with respect to the center line of the beam, the resulting voltage variations have sufficient definition at least to represent the effects of the stripes themselves. The extraneous minute irregularities which occur because of light dispersion and similar effects may be compensated for as described above in the threshold and limiting circuits 29 and 30.

FIG. 7 represents a portion of the surface of a typical piece of woven fabric. The type of weave shown is a basic weave for most fabrics and comprises vertical rows of weft or pick threads 61 (shown unshaded) interwoven with horizontal rows of warp threads 62 (shown shaded). In order to ascertain the number of weft threads per inch of fabric according to the principles of the present invention, the fabric should be moved with respect to the sensing unit 24 along a line parallel with the warp threads as indicated by the arrow. Also, as indicated, the light beam should have a cross-sectional dimension in the direction of movement of the fabric which is less than one-half the diameter of the weft threads. However, if the dimension of the beam at right angles to this direction is less than the diameter of a warp thread, it can be seen that many of the weft threads will not be detected, since half of them are masked along this line by overlapping warp threads. In order to alleviate this situation, it has been found preferable ot provide a concentrated light beam having a rectangularly shaped cross-section, one dimension of which is less than the diameter of the threads being counted and the other dimension exceeding the total distance over which any of the counted threads may be masked by other elements in the construction of the fabric. In the present case, the beam should concentrate on the fabric surface within a rectangularly shaped cross-sectional area as indicated at 63. In this manner, each weft thread is exposed to at least a portion of the beam and causes a detectable variation in the manner described.

The production of a beam having a rectangular cross-section is facilitated in the present arrangement by using a light source having a filament which is itself of a generally rectangular shape. Thus, by the use of conventional spherical lenses, and by adjusting them according to well-known optical techniques, a rectangularly shaped beam of any desired dimensions may be focused on the fabric surface.

Although a particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for indicating the concentration of recurring surface contours caused by the thread arrangement in a piece of fabric, said apparatus comprising means for generating first signals representative of the movement of a piece of fabric in a given direction past a given point, a photosensitive element mounted above said point and oriented with its light sensitive surface facing said point, a light source also mounted above said point, means for concentrating light energy from said light source into a narrow beam and for directing said beam down against the moving fabric at said given point, said light concentrating means being of such construction that it effectively restricts the cross-sectional dimension of said beam in the direction of fabric movement to an amount substantially less than the corresponding distance in the same direction across the individual surface contours on the fabric so that the beam will strike the fabric at different angles as the contours on the fabric move past said given point, and because of this change in its angle of incidence, the beam will be reflected successively in different directions and thus will be swung into and out of the line of sight of said photosensitive element, means for generating second signals in response to the reflection of said beam onto said light sensitive surface and means for indicating the ratio between said second and first signals.

2. Apparatus as in claim 1 wherein said light concentrating means is operative to shape said beam to a cross-sectional configuration at said given point having a dimension transverse to said direction of movement which exceeds the maximum distance over which the surface contour of any thread in the fabric is masked by other threads in the fabric.

3. In combination with a piece of fabric and means for moving same along a given path and in a given direction past a given point, means for generating first signals representative of the movement of said fabric past said given point, a photosensitive element mounted above said point and oriented with its light sensitive surface facing said point, a light source also mounted above said point, means for concentrating light energy from said light source into a narrow beam and for directing said beam down against the moving fabric at said given point, said light concentrating means being of such construction that it effectively restricts the cross-sectional dimension of said beam in the direction of fabric movement to an amount substantially less than the corresponding distance in the same direction across the individual surface contours on the fabric so that the beam will strike the fabric at different angles as the contours on the fabric move past said given point, and because of this change in its angle of incidence, the beam will be reflected successively in different directions and thus will be swung into and out of the line of sight of said photosensitive element, means for generating second signals in response to the reflection of said beam onto said light sensitive surface and means for indicating the ratio between said second and first signals.

4. Apparatus for indicating the concentration of recurring surface contours caused by the thread arrangement in a piece of fabric, said apparatus comprising a wheel mounted to be rotated by the movement of a piece of fabric past a given point, means for generating a first signal pulse in response to said wheel undergoing a given amount of rotation, a contour sensing unit comprising an outer casing having a spacer head projecting from one side thereof, said casing being mounted with its spacer head in contact with said fabric at said given point, a light source located within said casing, condensing and focusing lens means arranged within said casing to direct light from said source into a narrow beam which projects through said spacer head to said fabric at said given point, a photosensitive element also mounted within said casing, said photosensitive element having a light sensitive surface facing said given point, said lens means being of such construction that it effectively restricts the cross-sectional dimension of said beam in the direction of fabric movement to an amount substantially less than the corresponding distance in the same direction across the individual surface contours on the fabric, so that the beam will strike the fabric at different angles as the contours on the fabric move past said given point, and because of this change in its angle of incidence, the beam will be reflected successively in different directions and thus will be swung into and out of the line of sight of said photosensitive element, means for generating second signal pulses in response to the reflection of said beam onto said light sensitive surface and means for indicating the ratio between said second and first signal pulses.

References Cited by the Examiner
UNITED STATES PATENTS

| 2,037,044 | 4/1936 | Reinartz et al. | 88—4 |
| 2,085,671 | 6/1937 | Powers | 209—82 |
| 2,207,506 | 7/1940 | Cox | 235—92 |
| 2,589,741 | 3/1952 | Slechta | 235—92 |
| 2,617,593 | 11/1952 | Audier et al. | 235—132 |
| 2,910,908 | 11/1959 | Meyer | 235—92 |
| 2,944,667 | 7/1960 | Stevens | 209—111 |
| 3,019,346 | 1/1962 | Laycak | 235—92 |
| 3,019,972 | 2/1962 | Strother | 235—92 |
| 3,074,631 | 1/1963 | Buysch | 235—92 |
| 3,096,443 | 7/1963 | Laycak | 235—92 |

MALCOLM A. MORRISON, *Primary Examiner.*